United States Patent [19]
Olschewski et al.

[11] 4,206,952
[45] Jun. 10, 1980

[54] ROTARY DRILL BIT WITH A POROUS CUP BEARING

[75] Inventors: Armin Olschewski; Heinrich Kunkel, both of Schweinfurt; Manfred Brandenstein, Aschfeld; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 969,092

[22] Filed: Dec. 13, 1978

[30] Foreign Application Priority Data

Dec. 21, 1977 [DE] Fed. Rep. of Germany ....... 2756964

[51] Int. Cl.² ............................................. F16C 17/02
[52] U.S. Cl. ................................ 308/8.2; 308/DIG. 5
[58] Field of Search ...................... 308/8.2, 8, DIG. 5; 175/227, 371, 372, 228, 229

[56] References Cited
U.S. PATENT DOCUMENTS

| 2,676,790 | 4/1954 | Turner | 175/227 |
| 3,984,158 | 10/1976 | Sorensen et al. | 308/8.2 |
| 3,998,500 | 12/1976 | Dixon | 307/8.2 |
| 4,102,419 | 7/1978 | Klima | 175/371 |

Primary Examiner—Lenard A. Footland
Attorney, Agent, or Firm—Eugene E. Renz, Jr.

[57] ABSTRACT

A rotary drill bit having a plurality of cutters, each rotatably mounted on a trunnion. The bearing support includes a friction bearing consisting of a cup member of half-moon shape preferably made of an oil soaked sintered material. The outer surface of the cup engages the bore of the cutter and forms the non-loaded part of the slip surface in the unloaded zone of the friction bearing. The cup is mounted in a manner retaining the cutter against axial displacement from the trunnion. Biasing means between the cup and trunnion presses the cup against the cutter bore and compensates for wear of the cup.

5 Claims, 4 Drawing Figures

ROTARY DRILL BIT WITH A POROUS CUP BEARING

BACKGROUND OF THE INVENTION

The present invention relates to drilling apparatus for use in exploring underground petroleum reserves and more specifically to a novel improved means for mounting the rotary cutters on the trunnion of the rotary drill bit.

In the prior art, it is known to mount the rotary cutters on the trunnion by means of a slip ring of lubricant-holding material, such as a self-lubricating plastic, which engages one surface of the rotary cutter and the trunnion of the rotary drill bit in a circular groove. This arrangement is shown in German Pat. No. DE-PS 1 141 962. A disadvantage of this known design is that in order to accommodate the slip ring, it is necessary to form a relatively deep circular groove in the slip surface of the trunnion which tends to weaken the trunnion. A further disadvantage is that the slip ring displaces part of the radially supporting slip surface of the friction bearing so that the bearing has a comparatively small load carrying capacity. Additionally, in this prior known arrangement, there is a very little space to accommodate storage of lubricant in the bearing cavity of the rotary cutters so that the surface life of the rotary drill bit is limited by reason of bearing failure due to poor lubrication. It has been found that the problem cannot be alleviated by simply increasing the size of the parts to increase the strength of the rotary drill bit and enlarge the lubricant storage cavity since the size of the entire assembly is limited by the diameter of the bore hole which must be kept small for economic reasons.

In veiw of the above, an object of the present invention is to provide a compact rotary drill bit with plural rotary cutters which have a high load carrying capacity and high strength.

It is also an object of the present invention to provide an assembly which ensures adequate lubrication of the bearing over a prolonged period of time and incorporates a comparatively simple and effective means for securing the rotary cutter against axial displacement from the trunnion.

SUMMARY OF THE PRESENT INVENTION

The rotary drill bit of the present invention is characterized by novel features of construction and arrangement including a relatively bend resistant bit trunnion since it is not weakened by retaining grooves or recesses. The friction bearing of the rotary cutter possesses a high load carrying capacity since the slip surface of the friction bearing in the load zone is not interrupted or reduced by retaining grooves or recesses.

In accordance with another feature of the invention, the friction bearing is supplied with adequate quantities of lubricant contained in a cup surrounding the trunnion which may be made for example of oil sintered material. This cup also secures the rotary cutter against axial removal. To this end the rotary cutter is firmly mounted on the trunnion by means of the cup which engages in a circular groove in the bore of the rotary cutter and which as a result of its self-lubricating properties guides the rotary cutter in a sliding manner to eliminate harmful wear or friction smudges on the side walls of the circular groove during operation.

In accordance with still other features of the invention, the oil sintered cup provides a relatively large reserve of lubricant and thus the assembly exhibits a long service life. The cup also provides radial guidance of the rotary cutter by sliding on the radial outer slip surface of the friction bearing.

During operation of the drill bit assembly, abrasion or escape of lubricant at the outer surface of the cup and bearing wear of the trunnion result in the reduction in the radial height of the cup and of the trunnion respectfully. Accordingly, in order to compensate for wear and ensure a good sliding and lubricating contact of the cup with the radially outer slip surface of the friction bearing during the complete service time, spring means may be provided which continuously presses the cup elastically against the slip surface.

Still another object of the present invention is to provide a drill bit assembly wherein the friction bearing is supplied with a lubricant over an extended period of use since the cup is made of an oil sintered material and continuously releases new and unused lubricant to the friction surfaces.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
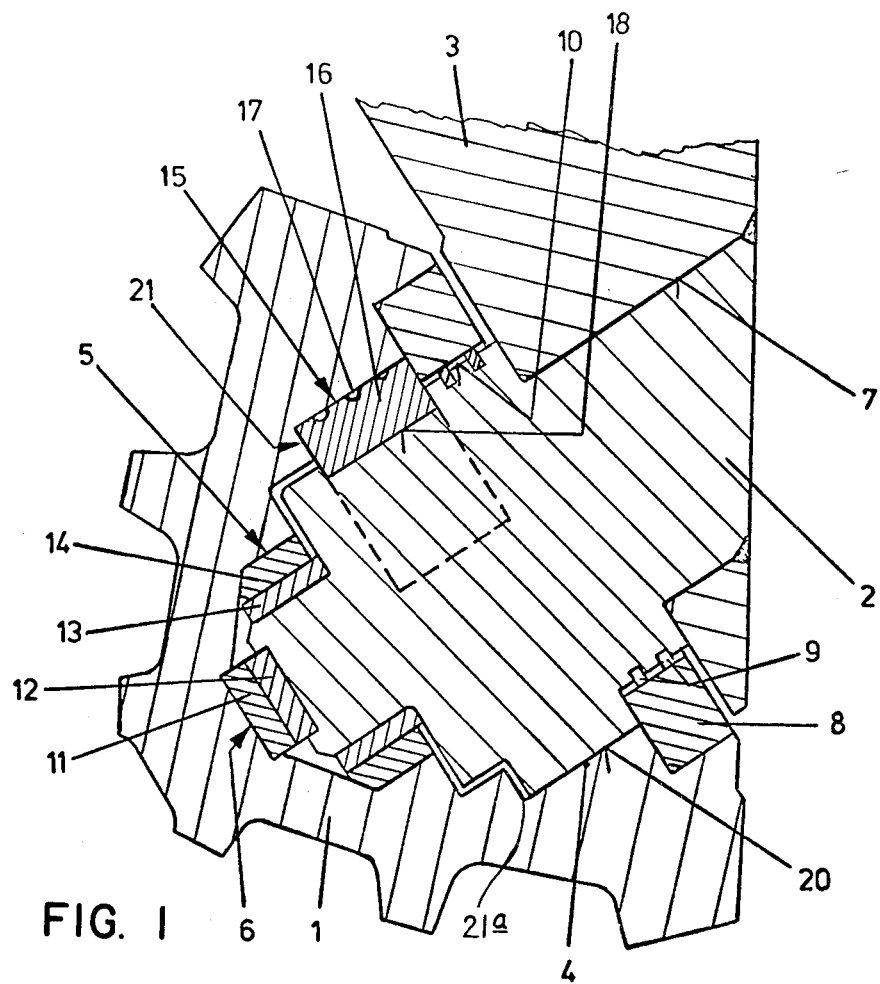
FIG. 1 is a transverse sectional view through a rotary cutter of a rotary drill bit constructed in accordance with the present invention.

Referring now to the drawings and particularly to FIG. 1 thereof, there is illustrated a rotary drill bit made in accordance with the present invention comprising a plurality of rotary cutters; each cutter supported on a trunnion 2 mounted in the drill bit body 3. The rotary cutter 1 is rotatably supported on the trunnion 2 in the present instance, by means of axially spaced radial friction bearings 4 and 5. An axial friction bearing 6 for taking up the axially directed working pressure of the rotary cutter is supported in the forward axial end face of the trunnion 2. As illustrated, the trunnion is supported in a bore 7 of the drill bit body 3 in a suitable manner, for example, welding. The axial friction bearing 6 is formed by a pair of sliding discs 11 and 12 which are made of a relatively hard alloy material. Likewise the friction bearing 5 comprises a pair of sliding sleeves 13, 14 which are mounted on the forward stepped cylindrical surface of the trunnion 2 and in the bore of the rotary cutter respectively. During operation of the rotary cutter, these discs slide relative to one another.

A flange ring 8 supported in a pocket formed in the bore of the rotary cutter is secured to the rotary cutter for example, by welding in a conventional fashion. The outer peripheral surface of the trunnion confronting the inner peripheral surface of the flange ring 8 is provided with a pair of axially spaced circular grooves for two piston rings 9 which produce a spring action against the inner peripheral surface 10 of the flange ring and in this manner seal the bearing cavity of the rotary cutter from the outside.

In accordance with the present invention, the rotary cutter is supported by another friction bearing assembly designated by the numeral 4 adjacent the end thereof nearest the drill bit body and remote from the tip. This friction bearing, as illustrated, includes a cup 16 of generally semi-circular or half-moon shape which seats in a pocket formed in the trunnion and is made of an oil soaked sintered material which has a plurality of small recesses in its outer peripheral surface for receiving and storing a solid lubricant, e.g. graphite. The cup is mounted and supported against rotation in a pocket in the outer peripheral surface of the trunnion which extends over about half the circumference of the trunnion 2. In this fashion the outer surface 19 of the cup forms the radially non-loaded part of the slip surface 20 in the non-load zone 15 of the friction bearing 4. In the load zone of the friction bearing 4 which, as illustrated, is diametrically opposite the non-load zone 15, the slip surface 20 is formed by the outer peripheral surface of the trunnion 20 which slides directly in the bore section of the rotary cutter 1 which it confronts, that is on the radial surface of the circular groove 21. Thus the cup 16 engages the surface 21 and is confined in an axial direction on one side by the flange ring 8 and on its other side by the radial annular wall or surface 21 in the bore of the rotary cutter. By this arrangement the rotary cutter 1 is held against the axial displacement on the trunnion 2. Note the axial width of the cup is such that cup 16 engages the radial wall 21 of the rotary cutter and there is a clearance 21a between rotary cutter and trunnion at the friction bearing 4.

Consider now the operation of the rotary cutter constructed in accordance with the present invention. As the rotary cutter rotates relative to the trunnion, the cup 16 slides against the side walls and against the surface of circular groove 21 with relatively little load. By reason of this, wear of the cup is very small. During this operation, lubricating oil is continuously delivered to the sliding contact surface, that is, the interior peripheral surface of the rotary cutter. As the cutter rotates, lubricating oil is delivered to the load zone of the friction bearing 4 and there lubricates the slip surface 20 between the outer surface of the trunnion 2 and the bore of the rotary cutter 1. Additionally, a small portion of the lubricating oil dispensed by the cup flows through the bearing cavity to the adjacent friction bearings 5 and 6 and thus lubricates the loaded slip surfaces in this region. Since the recess 18 for the cup 16 extends only a part of the peripheral surface of the trunnion, the trunnion strength is not weakened to the same extent as in the prior known arrangements. Furthermore, the slip surface of the friction bearing 14 is not interrupted by gaps for the axial retention of the cutter 1 on the trunnion and thus in a maximum radial load capacity of the rotary cutter is produced with an extremely compact assembly.

Figure 2:
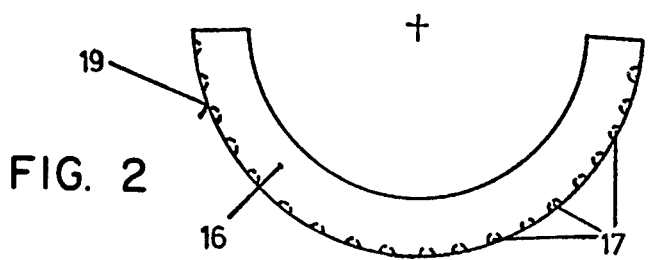
FIG. 2 is a side elevational view of the lubricating cup.
Figure 3:
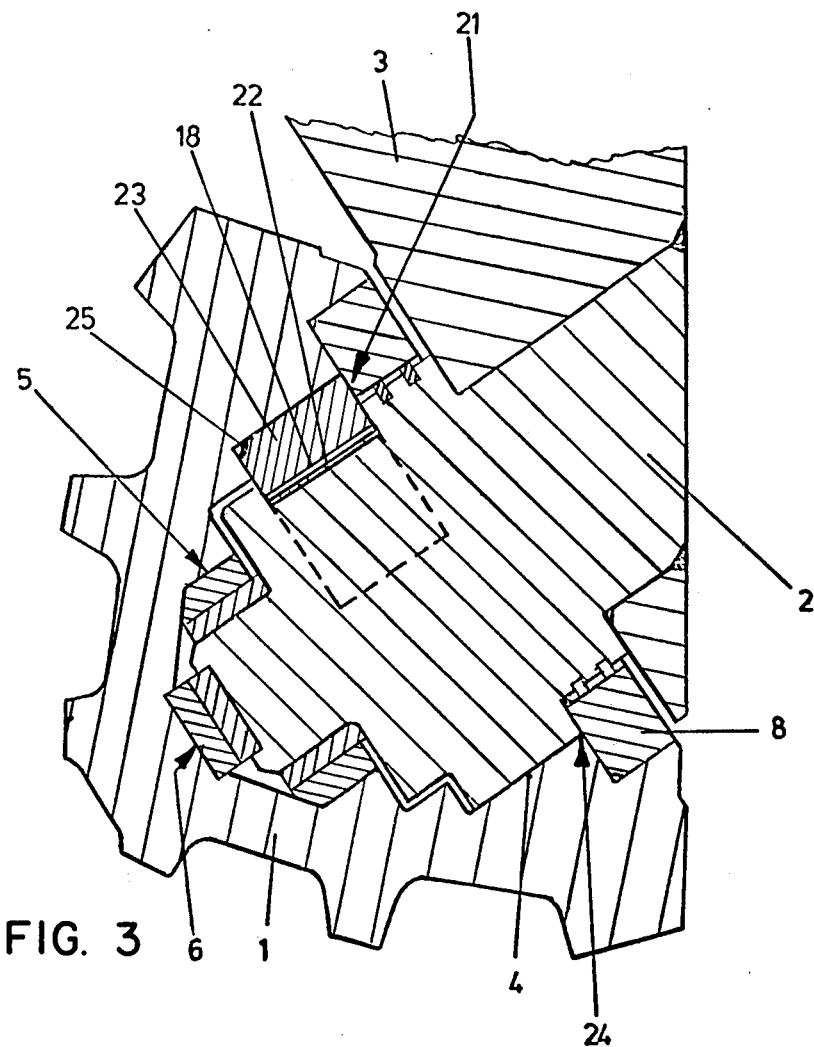
FIG. 3 is a transverse sectional view similar to FIG. 1 showing a modified form of mounting assembly in accordance with the present invention.
Figure 4:
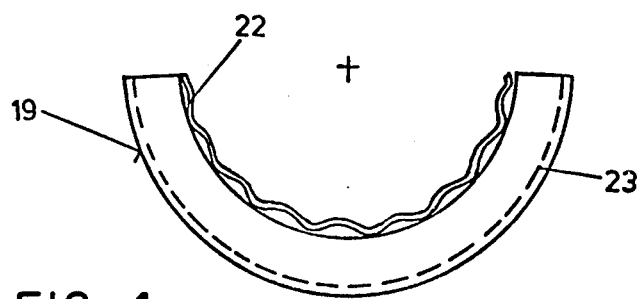
FIG. 4 is a side view of the cup including biasing means for pressing the cup radially outwardly to maintain continuous contact with the bore of the rotary cutter.

There is illustrated in FIGS. 3 and 4 a modified version of a rotary drill bit in accordance with the present invention. The basic elements and general arrangement of the assembly are similar to that described in connection with the embodiment illustrated in FIGS. 1 and 2 and therefore similar reference numerals are assigned. Thus the rotary cutter 1 is rotatably supported on the trunnion 2 in radial friction bearings 4 and 5 and axial friction bearing 6. The assembly further includes a ring flange 8 mounted in a pocket in the inner axial end of the rotary cutter nearest the drill bit body. The surface of the trunnion confronting the inner peripheral surface of the ring flange 8 has a pair of axially spaced circumferentially extending grooves for piston rings which seal the bearing cavity from an ambient atmosphere surrounding the rotary cutter. The assembly likewise includes a cup 23 of semi-cylindrical cross-section which seats in a groove extending approximately half the circumference of the trunnion in the nonload zone of the assembly. This cup 23 is preferably made of a similar material to cup 16, that is, of an oil-soaked sintered material. In the present instance, a spring plate 22 of corrugated, undulating shape is mounted between the pocket in the trunnion 2 and the cup. The spring place 22 normally biases the cup in a radially outward direction to press the outer circumferential surface 19 of the cup into engagement with the enlarged bore section of the trunnion. In order to secure the rotary cutter against axial displacement from the trunnion 2, the cup 23 engages in the circular groove 21 of the bore of the rotary cutter.

In assembling the parts, the cup 23 together with the spring plate 22 is first inserted into the recess 18 of the trunnion. Thereafter, the rotary cutter 1 with the friction bearings 5 and 6 in place is mounted over the trunnion. By this arrangement, the rotary cutter 1 presses with its shoulder 24 against the beveled outer edge 25 of the cup 23 and exerts a pressure against the cup in a radially inward direction against the spring plate 22. The flange ring 8 which is mounted over the trunnion before application of the rotary cutter is then secured in the bore of the rotary cutter by conventional means, for example, welding.

The cup 23 is filled with a supply of lubricant, e.g. solid lubricant. In operation, therefore, upon relative sliding of the cup against the inner peripheral surface of the bore of the rotary cutter, that is, the sidewalls of the circular groove 21, the cup in part delivers the lubricant necessary to lubricate the friction bearing 4 which then is transported automatically by rotary motion of the rotary cutter 1 to the load zone of the friction bearing 4. By reason of this rotating action some of the lubricant is also delivered through the annular space defining the bearing cavity to the friction bearing 5 and 6 and lubricates the contacting slip surfaces. In the event of friction wear of the cup 23, the spring plate 22 ensures that there is always a sliding and guiding contact between the cup 23 and the radially outward slip surface of the friction bearing 4.

In summary, an assembly constructed in accordance with the present invention provides a relatively large load carrying capacity and great strength in a compact assembly. In addition to this, the lubricating characteristics are effective to ensure delivery of adequate lubricant to the bearings and a long service life. The specific arrangement also ensures firm mounting of the rotary cutter against the displacement from the trunnion.

Even though the specific embodiments of the invention have been illustrated and described herein, it is to be understood the changes and modifications may be made therein within the scope of the following claims. For example, the rotary cutter friction bearing 4 equipped with a cup may be provided with slip surfaces in its load zone which are coated with a wear resistant alloy, e.g. tungsten carbide. Further, the cup can also be provided in one of the friction bearings adjacent the tip of the rotary cutter.

What is claimed is:

1. A rotary drill bit comprising at least one trunnion and a cutter rotatably supported on said cutter by bearing means including at least one friction bearing, said friction bearing comprising a cup-like member filled with a lubricant, said cup-like member opening radially inwardly and circumscribing at least part of the trunnion and means mounting the cup in a manner to retain said cutter against axial displacement from said trunnion, said cup engaging in the bore of said cutter.

2. A rotary drill bit as claimed in claim 1 wherein said cup seats in a recess in the outer peripheral surface of said trunnion extending over approximately half the circumference of said trunnion.

3. A rotary drill bit as claimed in claim 1 wherein the slip surface of said friction bearing is formed in the non-load zone on the trunnion by the outer peripheral surface of said cup.

4. A rotary drilling bit as claimed in claim 1 including biasing means pressing said cup (23) against the radially outer slip surface of said friction bearing.

5. A rotary drilling bit as claimed in claim 1 wherein said cup (16) is made of oil soaked sintered metal.

* * * * *